United States Patent
Johnson et al.

(10) Patent No.: US 12,126,376 B2
(45) Date of Patent: Oct. 22, 2024

(54) ALIEN WAVE INTEROPERABILITY SYSTEM

(71) Applicant: Level 3 Communications, LLC, Broomfield, CO (US)

(72) Inventors: Paul M. Johnson, Littleton, CO (US); James E. Shearer, Jenks, OK (US)

(73) Assignee: Level 3 Communications, LLC, Denver, CO (US)

(*) Notice: Subject to any disclaimer, the term of this patent is extended or adjusted under 35 U.S.C. 154(b) by 363 days.

(21) Appl. No.: 17/656,314

(22) Filed: Mar. 24, 2022

(65) Prior Publication Data

US 2023/0216582 A1 Jul. 6, 2023

Related U.S. Application Data

(60) Provisional application No. 63/296,225, filed on Jan. 4, 2022.

(51) Int. Cl.
*H04B 10/079* (2013.01)

(52) U.S. Cl.
CPC .................. *H04B 10/07955* (2013.01)

(58) Field of Classification Search
CPC ........ H04B 10/07955; H04B 10/07957; H04B 10/272; H04B 10/572; H04B 10/0795; H04B 10/40; H04B 10/27; H04B 10/564; H04B 10/0793
See application file for complete search history.

(56) References Cited

U.S. PATENT DOCUMENTS

| | | | |
|---|---|---|---|
| 2019/0238235 A1* | 8/2019 | Houtsma | H04B 10/64 |
| 2019/0306018 A1* | 10/2019 | Steverson | H04L 41/0806 |
| 2019/0319709 A1* | 10/2019 | Zheng | H04B 10/40 |
| 2021/0083778 A1* | 3/2021 | Honda | H04B 10/572 |

* cited by examiner

*Primary Examiner* — Hibret A Woldekidan (57) ABSTRACT

In an alien wave system, one or more transponders connected to a line system may be owned and operated by a different entity from the entity that owns and operates the line system. In such a situation, diagnosing and correcting faults, and achieving good performance, may be challenging. As such, a system and methods for interoperability in an alien wave system are provided.

17 Claims, 6 Drawing Sheets

Receive a plurality of operating parameters from the optical line system, from a first optical transponder connected to a first port of the optical line system, and from a second optical transponder connected to a second port of the optical line system ⌐ 200

Send an operating parameter of the plurality of operating parameters to the optical line system, or to the first optical transponder, or to the second optical transponder ⌐ 202

ALIEN WAVE INTEROPERABILITY SYSTEM

CROSS-REFERENCE TO RELATED APPLICATIONS

This application claims the benefit of U.S. Provisional Application No. 63/296,225 filed Jan. 4, 2022, entitled "Alien Wave Interoperability System," which is incorporated herein by reference in its entirety.

FIELD

One or more aspects of embodiments according to the present disclosure relate to optical data transmission, and more particularly to a system and method for integrating alien wave transponders and a line system.

BACKGROUND

In an alien wave system, one or more transponders connected to a line system may be owned and operated by a different entity from the entity that owns and operates the line system. In such a situation, diagnosing and correcting faults, and achieving good performance, may be challenging.

It is with respect to this general technical environment that aspects of the present disclosure are related.

SUMMARY

A system and methods for interoperability in an alien wave system are provided. In an aspect, a system is provided comprising an optical line system, and an orchestrator 115 connected to the optical line system. The optical line system may be configured to be connected, at a first port of the optical line system, to a first optical transponder. The orchestrator 115 may be configured (i) to be connected to the first optical transponder, (ii) to receive operating parameters from the optical line system and from the first optical transponder and (iii) to send a received optical parameter to the optical line system or to the first optical transponder. In another aspect, a method is provided, comprising receiving, by an orchestrator 115 connected to an optical line system, a plurality of operating parameters from the optical line system and from a first optical transponder connected to a first port of the optical line system; and sending, by the orchestrator 115, an operating parameter of the plurality of operating parameters to the optical line system or to the first optical transponder.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for integrating alien wave transponders and a line system provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
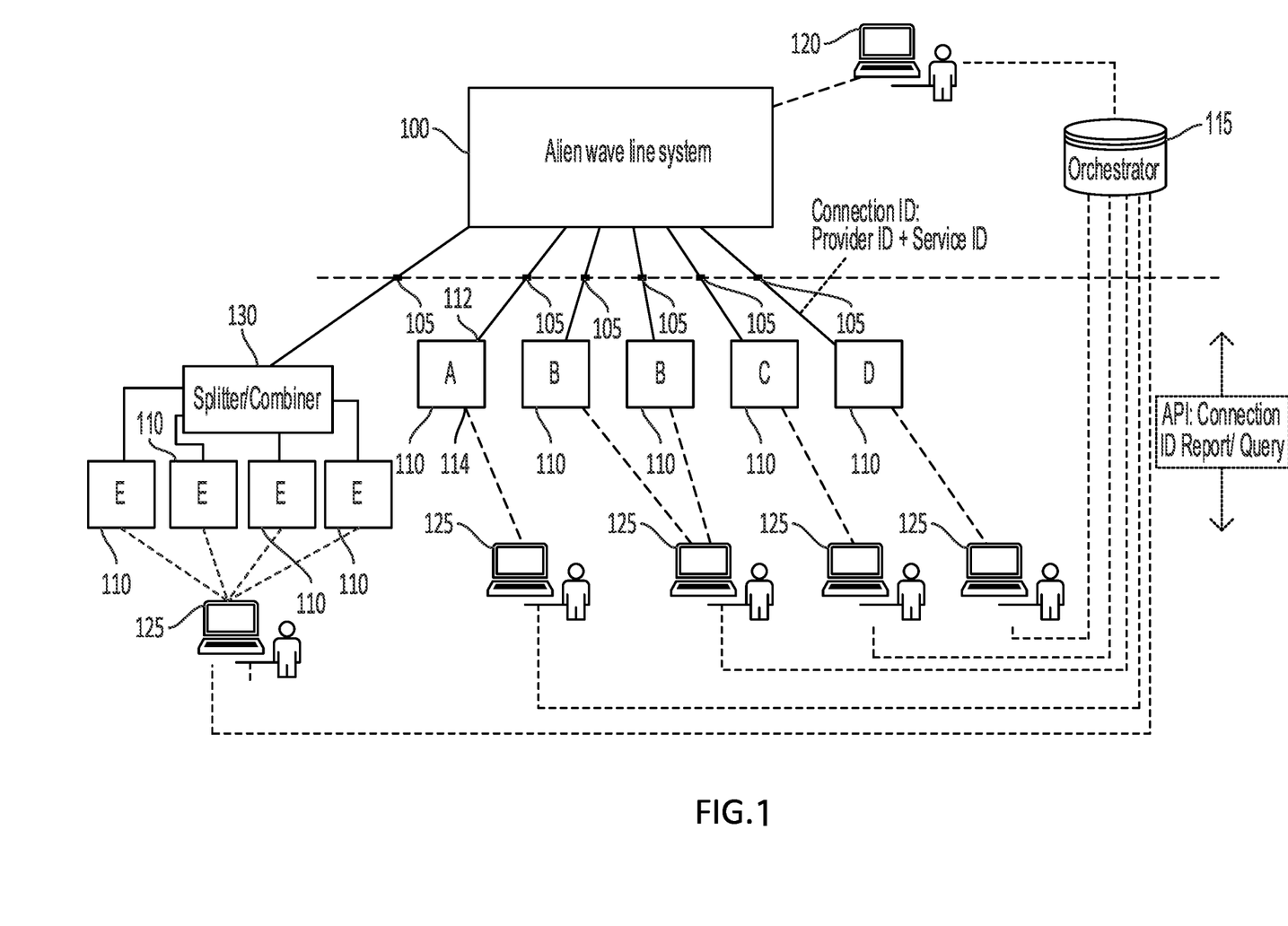
FIG. 1 is a block diagram of an alien wave system, according to an embodiment of the present disclosure.

FIG. 1 shows an alien wave system, in some embodiments. An optical line system 100, or "alien wave provider," includes a network of fiber-optic cables connected to, and providing optical data connections between, a plurality of ports 105. The line system 100 may be a dense wavelength division multiplexing (DWDM) system configured to transmit optical signals between the ports over a range of wavelengths, e.g., over a set, or "grid", of operating wavelengths near 1550 nm (e.g., a set of wavelengths on a grid with a spacing of about 0.8 nm (or 0.4 nm or 0.2 nm)). The line system may include, in addition to the fiber optical cables, optical amplifiers (e.g., erbium-doped fiber amplifiers, or Raman amplifiers), add-drop multiplexers (e.g., reconfigurable optical add-drop multiplexers (ROADMs) (for wavelength-dependent routing within the network), wavelength selectable switches (for wavelength-dependent routing and attenuation), filters, and variable optical attenuators. These components may enable the line system 100 to control the routing between the ports 105, and to control the power, at each of the operating wavelengths, at various points in the network.

Further, the line system 100 may include optical power monitors at various points in the network. Such an optical power monitor may include an optical splitter (e.g., a directional coupler) for splitting off a small portion of the light propagating in a fiber, and (i) a photodetector, e.g., a photodiode, to measure the total optical power propagating in that fiber, or (ii) an optical wavelength demultiplexer (e.g., a dispersive element such as a grating or prism) and an array of photodetectors to measure the optical power at each of the operating wavelengths.

A plurality of transponders 110 may be connected to the ports 105. Each transponder 110 may have a network-facing data interface 112 (which may be an optical fiber connected to a respective port 105 (or a pair of fibers, one for transmitting light into the port 105 and one for receiving light from the port 105)) and a client-facing data interface (not shown) (which may be an electrical interface, or, an optical interface, e.g., for bidirectional data transmission at 1310 nm, over fibers). Although only one network-facing data interface 112 is shown on one of the transponders 110, each transponder 110 may include a network-facing data interface 112. In operation, a transponder 110 may receive data through the client-facing interface (e.g., from a web host connected to the client-facing interface), translate the data into a format (e.g., modulated light at one of the operating wavelengths of the line system 100) suitable for transmission by the line system 100, and transmit the data into the port 105. Similarly, the transponder 110 may receive data from the port 105 (e.g., in the form of modulated light at one of the operating wavelengths of the line system 100), translate the data into a format suitable for transmission through the client-facing data interface (e.g., into an electrical signal or a modulated optical signal at a wavelength of 1310 nm), and transmit the data through the client-facing interface, e.g., to a web host connected to the client-facing port. The transponder may include a photodetector (e.g., a photodiode) for receiving light from the line system 100, and a laser (e.g., a laser diode (e.g., a tunable, externally modulated laser diode)) for transmitting modulated light to the line system 100, e.g., at any of the operating wavelengths of the line system 100. Each transponder 110 may also have a control interface 114, through which commands and operating parameters may be exchanged, as discussed in further detail below.

As mentioned above, in some embodiments, the owner and operator of a transponder 110 (the "transponder operator") may be a different entity from the owner and operator of the line system 100 (the "line system operator"). The line system operator may allow the transponder operator to use the line system 100 to transmit data, at one or more specified wavelengths, between specified ports 105. Such a line system 100 may be referred to as an "alien wave" system. FIG. 1 shows transponders operated by five transponder operators, A, B, C, D, and E (each transponder being labeled with the letter identifying its operator). The boundary between the line system 100 and the transponders 110 may be a plurality of ports 105, each of which may include (e.g., consist of), for example, an optical fiber connector, or a pair of optical fiber connectors, one for light transmitted by the line system 100 and one for light received by the line system 100. It may be advantageous for various communications to be exchanged between the equipment of the transponder operator and the equipment of the line system operator, as discussed in further detail below.

A system for enabling such communications is illustrated in FIG. 1. An orchestrator 115, which may comprise an application running on a provider server (which may be a server operated by the line system 100 operator, or by a third party) exchanges communications with the line system 100, via a line system adapter 120, and with one or more transponders 110, via a corresponding plurality of transponder adapters 125. Transponders 110 operated by a single transponder operator may share a transponder adapter 125 (and, for example, in FIG. 1 the two transponders 110 operated by transponder operator B share a transponder adapter 125). The orchestrator 115 may aggregate and redistribute the information it receives from the line system 100 and the transponders 110, as discussed in further detail below. In some embodiments, the line system adapter 120 may be integrated into the line system 100, or integrated into the orchestrator 115, or absent. Similarly, in some embodiments, one or more of the transponder adapters 125 may be integrated into the corresponding transponders 110, or integrated into the orchestrator 115, or absent. In some examples, as used herein, an orchestrator 115 is an element that is configured to be connected to two or more components, and that is configured to receive operating parameters from them and redistribute some or all of the received operating parameters to the components. In other examples, an orchestrator 115 is an element that is configured to be connected (i) to a line system (e.g., through a line system adapter 120) and (ii) to one or more transponders 110 (e.g., through transponder adapters 125), and that is configured to receive operating parameters from them and redistribute some or all of the received operating parameters to the components. Each of the line system adapter 120 and the transponder adapters 125 may be managed and supervised by a human operator, as shown in FIG. 1, or autonomous (e.g., unsupervised by a human).

The transponder adapter 125 connected to a transponder 110 may be operated by the transponder operator. It may perform translation between a protocol and conventions employed by the transponder 110 and those employed by the orchestrator 115, as discussed in further detail below. Moreover, in situations in which the transponder operator has not delegated, to the operator of the orchestrator 115 (which may be the line system operator), authority to change settings or operating parameters in the transponder 110, the transponder adapter 125 may receive recommendations or requests from the orchestrator 115 and it may (subject to rules or constraints with which it may be configured by the transponder operator) send commands to the transponder 110 to make such changes, in response to the requests or recommendations received from the orchestrator 115, e.g., as part of an automated troubleshooting process, as part of an attempt to diagnose a fault, etc.

In operation, each transponder 110 may report various operating parameters to the orchestrator 115. For example, the transponder 110 may, in operation, transmit light with a certain optical power through the network-facing data interface 112 and receive light at a certain optical power from the network-facing data interface 112, and it may report the transmitted optical power and the received optical power to the orchestrator 115 (shown in FIG. 1 as server 115). The transponder 110 may further decode the data it receives from the line system 100 using a forward error correcting code, and, in the process, calculate a metric of data quality, or "performance metric," such as an optical signal to noise ratio (OSNR), a bit error rate, or a Q-factor; the transponder 110 may also report these parameters (i.e., the OSNR, Q-factor, and bit error rate) to the orchestrator 115. Further, the transponder 110 may report other parameters, including, for example, any alarms (e.g., a low optical power alarm if the optical power received by the transponder 110 through the network-facing data interface 112 is less than a threshold, or a voltage out of range alarm or a temperature out of range alarm if a power supply voltage or a temperature is not within a respective acceptable range), the wavelength transmitted (through the network-facing data interface 112) by the transponder 110, the modulation type and modulation bandwidth transmitted by the transponder, the modulation type received by the transponder, and the transponder interface status (e.g., whether the interface is up, down, in service, or out of service). The transponder may report such operating parameters to the orchestrator 115 periodically, or upon request from the orchestrator 115. The modulation type (e.g., non-return to zero (NRZ), or 4-level, 16-level, or 64-level pulse amplitude modulation (PAM4, PAM16, PAM64)) may affect the minimal OSNR, BER, or Q-factor acceptable to support high quality data transmission. The orchestrator 115 may use the modulation type to optimize the optical power levels as well as the spacing between various wavelengths in the line system 100 to prevent signal cross-talk and other channel impairments while maximizing the usage of the spectrum available. In addition, each modulation type may require different amounts of spectrum for a given modulation rate. The line system 100 may infer the modulation bandwidth from the modulation type and the modulation rate, or the transponder 110 may report the modulation bandwidth, as mentioned above.

At startup, or after a system reset, or on other occasions determined by the line system 100, the transponder 110 may report, to the line system 100, via the orchestrator 115, the transmit and receive bandwidth needed, and the line system 100 may assign a corresponding set of wavelengths to the transponder 110, or, if the needed bandwidth is not available, the line system 100 may report, to the transponder 110, via the orchestrator 115, the wavelengths and bandwidth available. The line system 100 may also report, to the orchestrator 115, the geographic locations of the originating endpoint of each circuit and of the terminating endpoint of each circuit. Knowing the modulation bandwidth required by each transponder 110 may enable the line system 100 to prevent one service from impacting other services. This information may also enable the line system 100 to increase efficiency in the usage of the available bandwidth of the entire spectrum of the line system 100. For example, if one transponder operator has configured a transponder 110 with a modulation type that consumes greater bandwidth, then the line system 100 may use this information to prevent that wavelength service from impacting other adjacent wavelength services. As such, the orchestrator 115 may negotiate the wavelength to an available band of spectrum that would not impede or disrupt traffic of other customers.

The line system 100 may similarly report, to the orchestrator 115, various operating parameters. These parameters may include, for example, any alarms (e.g., a low optical power alarm, or an incorrect wavelength alarm, if insufficient optical power, or light at an incorrect wavelength, is received from any of the transponders 110), the power transmitted at each port 105, and the power received at each port 105.

Communications between the transponders 110 and the corresponding transponder adapters 125 may be sent over Ethernet using Transaction Language 1 (TL1 Command Line Interface (CLI), or Simple Network Management Protocol (SNMP). Communications between the transponder adapters 125 and the orchestrator 115 may be sent using, for example, an applications programming interface (API), and/or a protocol such as Network Configuration Protocol (NETCONF) or Representational State Transfer Configuration Protocol (RESTCONF). As mentioned above, each of the transponder adapters 125 may translate between (i) the protocol employed by the transponder 110 and (ii) the protocol employed by the orchestrator 115. Such translation may also include translating terminology (e.g., if two different phrases are used to describe, e.g., the optical power received by a transponder) or units (e.g., translating between mW and dBm). As mentioned above, the transponder adapters 125 may send reports to the orchestrator 115 periodically, or upon request (e.g., upon receiving a query) from the orchestrator 115. Similarly, the transponder adapters 125 and the line system adapter 120 may receive reports periodically from the orchestrator 115 or in response to the sending of a query, by a transponder adapter 125 or the line system adapter 120, to the orchestrator 115.

In some embodiments, the orchestrator 115 maintains a virtual information board including the operating parameters reported by each of the transponders 110 and by the line system 100. This information may be made available to the line system operator (e.g., to the line system adapter 120) and to all of the transponder operators. In some embodiments (e.g., if a transponder operator has not consented to have information specific to the transponder operator's transponders shared with other transponder operators), the orchestrator 115 may report, to each transponder operator (e.g., to the transponder operator's transponder adapters 125) only information that is specific to the transponders 110 of the transponder operator. The orchestrator 115 may, however, diagnose faults based on whether symptoms are being reported by a single transponder 110 or by a plurality of transponders 110, and report to each of the transponder adapters 125 conclusions regarding the likely cause of the fault, as discussed in an example below.

The orchestrator 115 may maintain a cross-reference list indicating which transponder 110 each of the ports 105 of the line system 100 is connected to. For example, each port 105 may have a unique port identifier (e.g., a port number) and each transponder 110 may also have a unique identifier (which may be composed of a provider ID and a service ID, as shown in FIG. 1). The orchestrator 115 may determine, based on this list, which line system parameters correspond to which transponder 110.

The orchestrator 115 may make it possible to diagnose and solve or mitigate faults not readily handled by either the line system 100 or a transponder 110 alone. Faults that persist after automated attempts to remedy them may be escalated, e.g., to human operators capable of additional troubleshooting, such as inspecting fibers for damage. For example, the orchestrator 115 may periodically receive, from the transponder 110, a report of optical power received by the transponder 110, and compare it to a threshold (e.g., a set minimum acceptable received power). If the received optical power is less than the threshold, the orchestrator 115 (or another part of the system, e.g., the line system adapter 120 or a control element within the line system 100) may cause (by the sending of a suitable command, request, or recommendation) the optical power transmitted by the line system 100 to be increased by an amount expected to bring the received optical power above the threshold. For example, the line system may change (e.g., decrease) an optical attenuation or change (e.g., increase) an optical gain, with one of the changes being a change expected to bring the received optical power above the first threshold. In some embodiments, the transponder 110 may also (or instead) periodically compare the received optical power to a threshold and report a low optical power alarm to the orchestrator 115 if the received optical power is less than the threshold. The receipt of such an alarm may similarly cause the orchestrator 115 to cause the optical power transmitted by the line system 100 to be increased. As used herein, a "low optical power alarm" is an alarm raised (e.g., sent or reported) by an element of the system when the optical power it receives falls below a threshold.

In another example, at startup the line system 100 may report, to the transponder 110, via the orchestrator 115, the expected ideal optical power to be received by the line system 100. The system may align or match the transponder to an available wavelength, and respond to both the line system and transponder with configuration information. The system may then monitor the optical power levels reported from both the line system 100 and the transponder 110 until the line system and transponder interface report "up" or "in service" status. The orchestrator 115 may then distribute the information it has in a manner that allows the various components of the system to work toward optimizing the performance of the system as a whole. For example, the system may then begin to monitor the OSNR, Q-factor, or errors of the transponder 110, and adjust power levels in the line system until acceptable or optimized performance is achieved.

The line system 100 may also periodically report, to the orchestrator 115, the optical power received, by the line system 100, at each port 105, and the system may determine whether the received optical power is below a threshold related to (e.g., somewhat less than) the expected ideal optical power to be received. If the received power at any port 105 is below the threshold, the line system 100 may report the received optical power to the orchestrator 115, which may forward the report to the transponder adapter 125 associated with the port. The transponder adapter 125 may then determine whether a suitable increase in the laser current is expected to remedy the shortage of optical power, and, if so, it may send a command to the transponder 110 to increase the laser drive current by an amount expected to bring the received optical power above the threshold. If the transponder adapter 125 determines that an increase in the laser current is not expected to remedy the shortage of optical power (e.g., if the laser current is already near its maximum value), then the transponder adapter 125 may increase the laser current to the maximum laser current, and report the increase in the laser current. In such a situation it may be possible that an adjustment in the line system 100 (e.g., a reduction in optical attenuation, or an increase in gain in an optical amplifier) may restore acceptable operation and clear the alarm. If the system determines, however, that the alarm persists, it may escalate a problem report (e.g., for human troubleshooting).

If, in addition to detecting low optical power at a first port 105, the line system 100 detects low received power from a plurality of transponders 110 (e.g., if the line system 100 also determines that the optical power received, at a second port 105, by the line system 100, is low), it may report to the transponders 110 that the received optical power is low, and also report a tentative fault identification within the optical line system, i.e., it may that the fault is present for a plurality of transponders 110 and that the cause is likely to be within the line system 100. In some embodiments, such a situation may cause the orchestrator 115 to produce a cascading alarm, with (i) each of the transponder adapters 125 being sent an alarm indicating that power received by the line system 100 is low, and (ii) each of the transponder adapters 125 further being notified that the cause of the alarm is likely within the line system 100.

In some embodiments, the line system 100 monitors the wavelength received, by the line system 100, at each port 105, and reports the received wavelengths to the orchestrator 115. An operating wavelength may be assigned, by the line system 100, to each of the ports (the assigned wavelength being one that the line system 100 will accept from the transponder 110 at the port 105). If the line system 100 determines that a wavelength that is different from the assigned wavelength is being received, by the line system 100, at a port 105, it may report the received wavelength, and an incorrect wavelength alarm, to the orchestrator 115, which may relay the reports to the transponder 110 connected to the port 105. Upon detection of an incorrect wavelength, the line system 100 may also attenuate (e.g., block) the light received from the transponder 110 connected to the port 105.

If a fault in the line system 100 causes a link between two ports 105 to be broken, the line system 100 may identify an alternate data route, within the line system 100, between the same endpoints. In some circumstances, it may be the case that the operating wavelength currently being used by a transponder 110 connected to an affected port 105 is not available on the alternate route, but that another wavelength is available. In such a situation, the line system 100 may generate, and the orchestrator 115 may forward, to the transponder 110, a report of the fault and an offer of service on the other wavelength. The transponder adapter 125 may then accept the offer (by a suitable reply to the orchestrator 115) and command the transponder 110 to switch to a different operating wavelength. Upon receiving the acceptance (e.g., via the orchestrator 115) the line system 100 may assign the new wavelength (i.e., the other wavelength) to the port 105 to which the transponder 110 is connected. The input power on the optical amplifiers in the line system 100 may be monitored continuously. In some embodiments, the process of collecting, analyzing and responding to the data is automated so as to ensure, as much as possible, consistent and reliable data transmission.

In some embodiments, a transponder 110 may include a plurality of lasers and a multiplexer for combining modulated light produced at a plurality of wavelengths onto a single transmitting fiber, which may be connected to a first fiber connector of a port 105. Similarly, the transponder 110 may include a demultiplexer and a plurality of photodiodes, each configured to detect light at a respective wavelength of a plurality of wavelengths received through a receiving fiber, which may be connected to a second fiber connector of a port 105. In such an embodiment, reporting and commanding may be performed separately for each received wavelength and for each transmitted wavelength. In another embodiment, multiple transponders 110 may each transmit light at a respective wavelength into a splitter/combiner (e.g., a wavelength multiplexer) 130 and the light at the output of the combiner 130 may be delivered to the line system 100 through a single port 105, as illustrated, in FIG. 1, for the transponders 110 of transponder operator E. The line system 100 may carry each signal individually. For example, four transponder signals that are 50 GHz channels centered on 25 GHz, 75 GHz, 125 GHz, and 175 GHz may be combined and transmitted into a single port 105. The line system 100 may carry these as four distinct services, each having a 50 GHz bandwidth, and centered on 25 GHz, 75 GHz, 125 GHz, and 175 GHz, respectively.

The startup of a new transponder may proceed as follows, using a largely or entirely automated process. A transponder operator may connect transponders 110 to ports 105 at the originating and terminating endpoints of a circuit of the line system 100. The transponder operator may then send a request for bandwidth to be provided. The line system 100 may be pre-equipped with two such open ports 105 that a transponder operator is able to connect to. When the transponder operator connects to open ports 105 at the endpoints, a request may be sent from one of the transponders 110 (or from a transponder adapter 125 (e.g., autonomously, or under the control of a human operator at the transponder adapter 125)) to the orchestrator 115 to request or negotiate bandwidth between the endpoints. The line system 100 or the line system adapter 120 (e.g., autonomously, or under the control of a human operator at the line system adapter 120), may then determine an available center frequency for the bandwidth and reply to the orchestrator 115. Once the frequency and bandwidth are negotiated, power levels may be negotiated and the service may be activated.

Figure 2A:
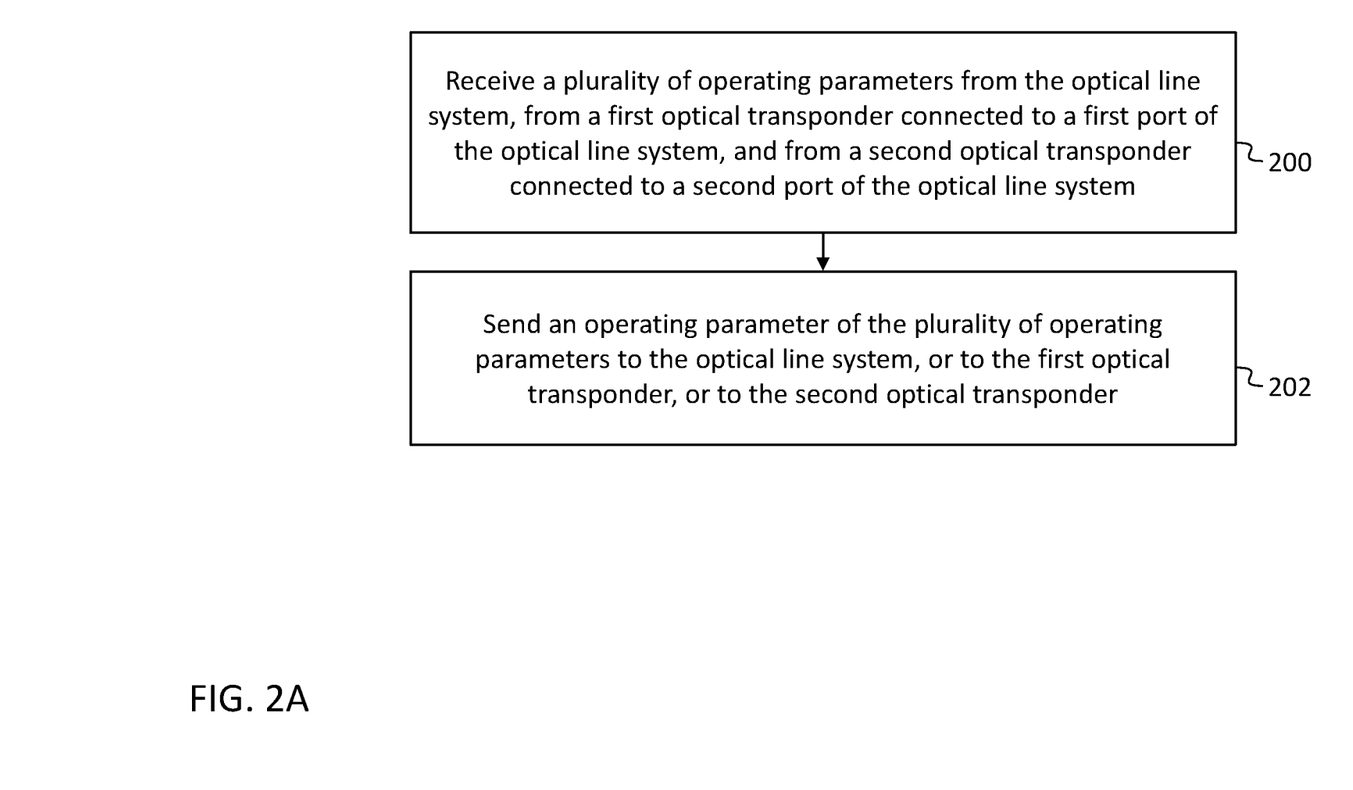
FIG. 2A is a flow chart of a method, according to an embodiment of the present disclosure.
Figure 2B:
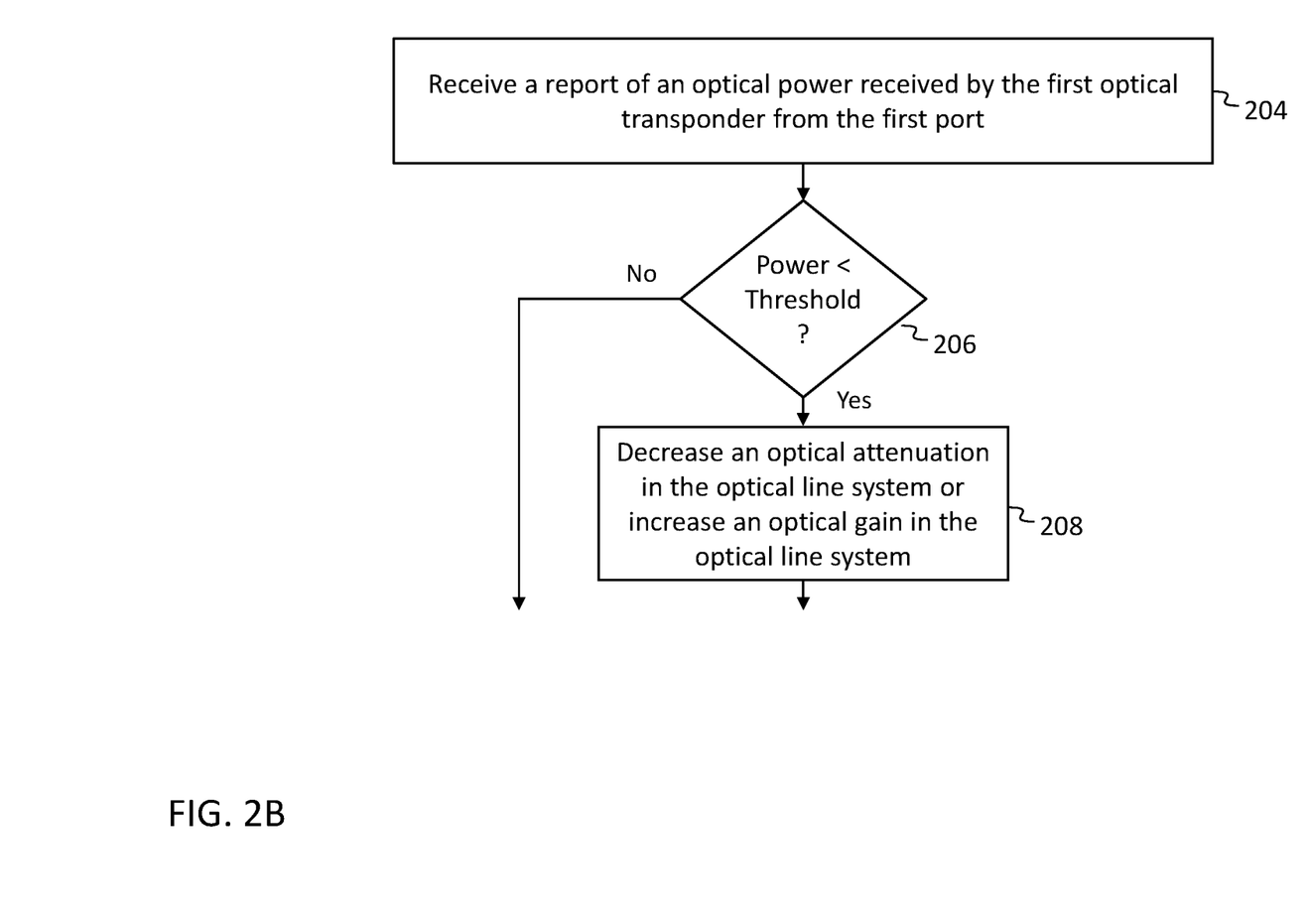
FIG. 2B is a flow chart of a method, according to an embodiment of the present disclosure.

FIGS. 2A-2D are flow charts of methods in some embodiments. As illustrated in FIG. 2A, in some embodiments, a plurality of operating parameters (e.g., parameters including measured optical power at various points) are received, at 200, from the optical line system, from a first optical transponder connected to a first port of the optical line system, and from a second optical transponder connected to a second port of the optical line system. An operating parameter of the plurality of operating parameters may then be sent, at 202, to the optical line system, or to the first optical transponder, or to the second optical transponder. As illustrated in FIG. 2B, a report, of an optical power received by the first optical transponder from the first port, may be received, at 204. If, as determined at 206, the optical power is below a first threshold, then, at 208, an optical attenuation in the optical line system may be decreased by an amount expected to bring the optical power above the first threshold, or an optical gain in the optical line system may be increased by an amount expected to bring the optical power above the first threshold.

Figure 2C:
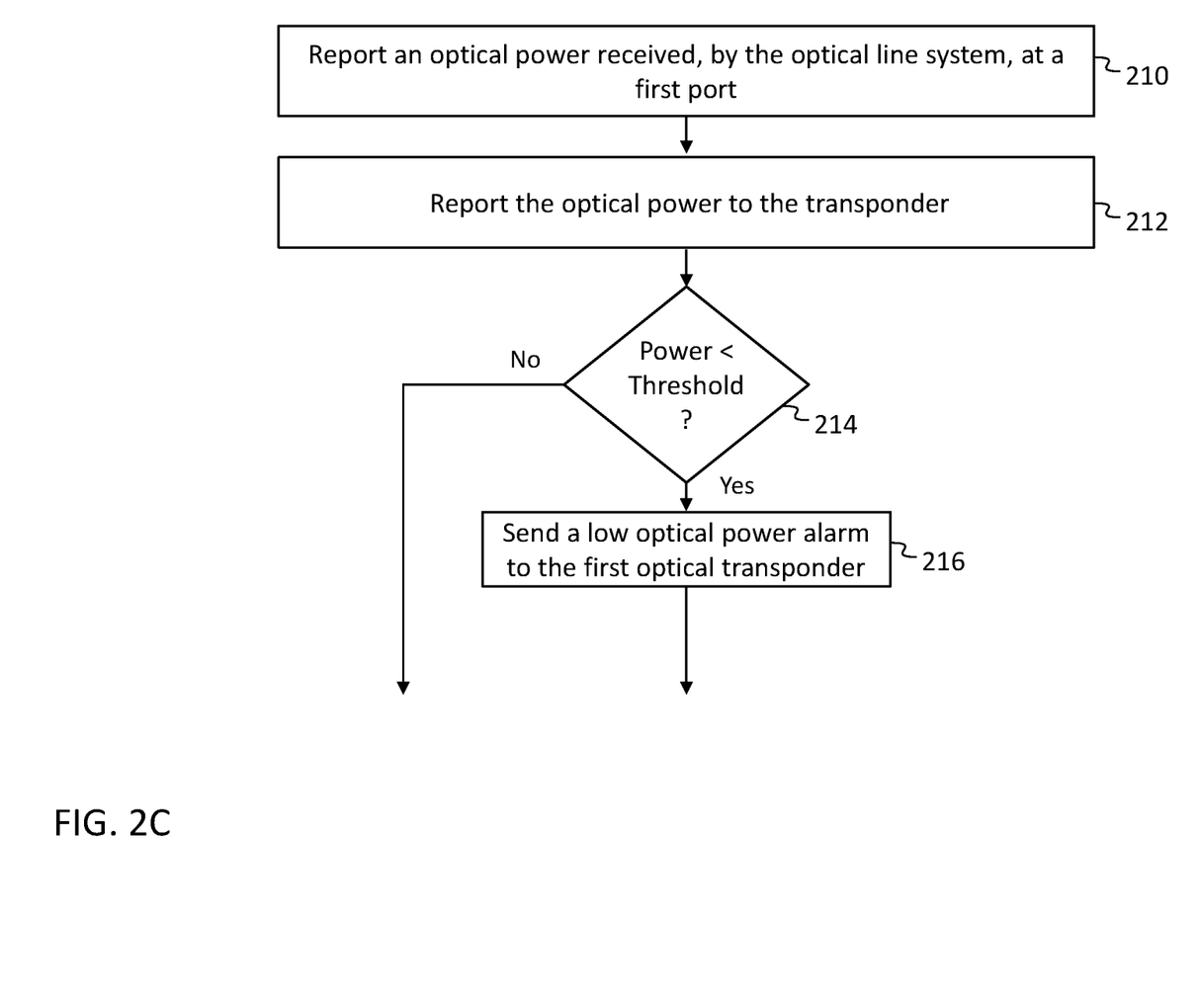
FIG. 2C is a flow chart of a method, according to an embodiment of the present disclosure.
Figure 2D:
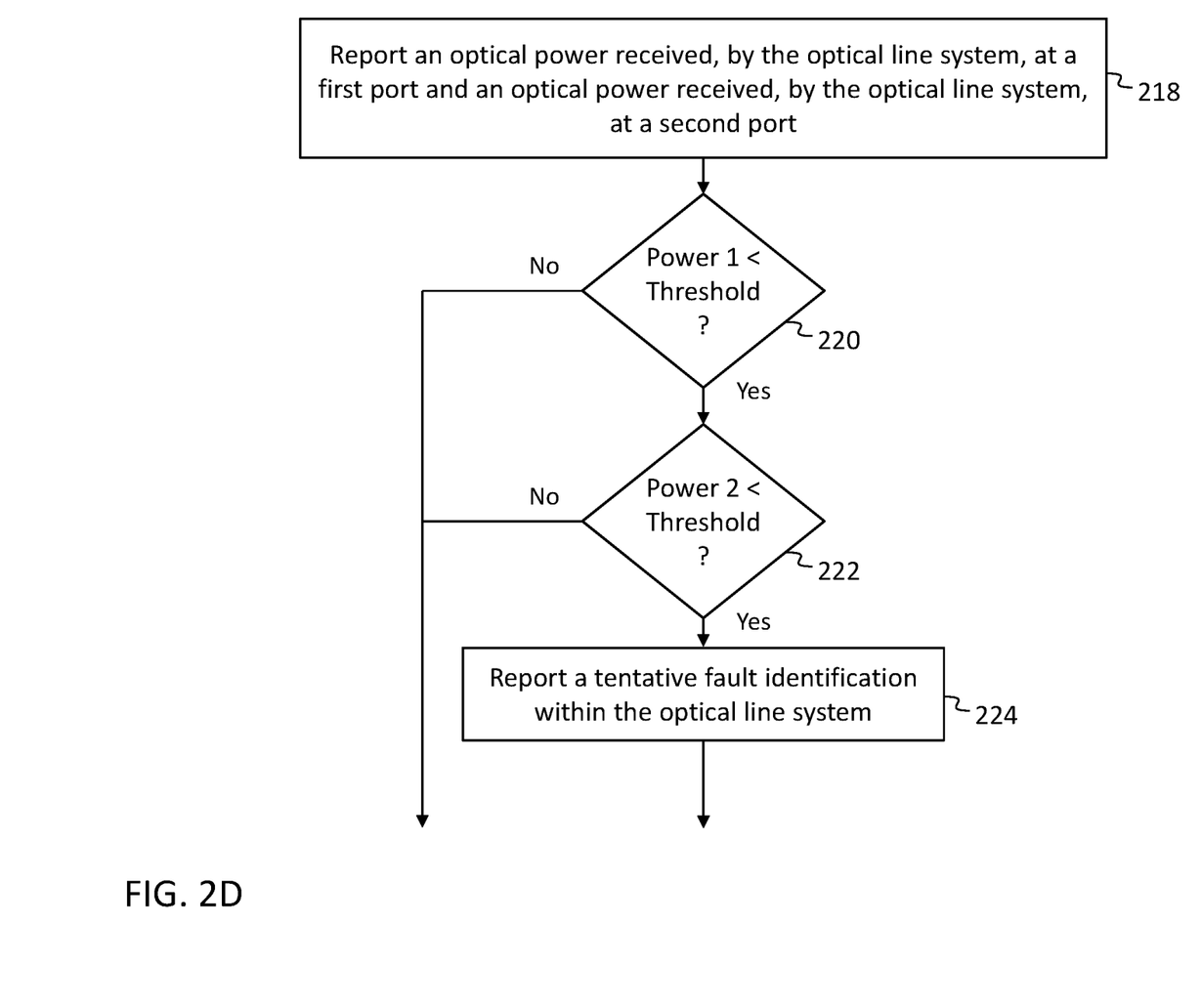
FIG. 2D is a flow chart of a method, according to an embodiment of the present disclosure.

As illustrated in FIG. 2C, an optical power received, by the optical line system, at the first port, may be reported, at 210, to the orchestrator 115, and reported, at 212, to the first optical transponder. If, as determined at 214, the optical power is less than a second threshold, a low optical power alarm may be sent, at 216, to the first optical transponder. As illustrated in FIG. 2D, in some embodiments, an optical power received, by the optical line system, at a first port of the optical line system and an optical power received, by the optical line system, at a second port of the optical line system may be reported, at 218, to the orchestrator 115. If, as determined at 220 and 222, (i) the optical power (Power 1) received, by the optical line system, at the first port of the optical line system is less than the second threshold and (ii) the optical power (Power 2) received, by the optical line system, at the second port of the optical line system is less than the second threshold, then a tentative fault identification within the optical line system may be reported to the first optical transponder and to the second optical transponder.

Figure 3:
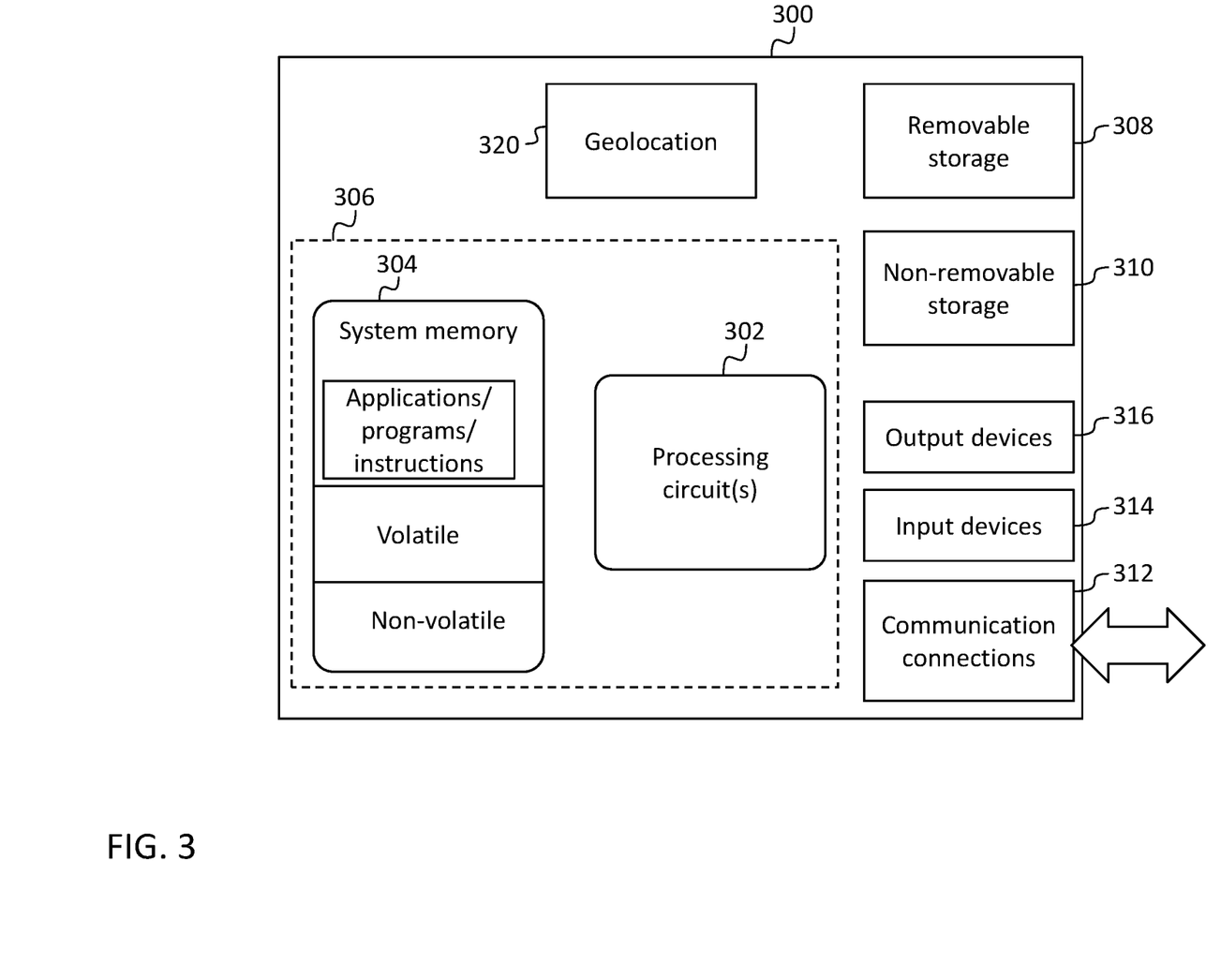
FIG. 3 is a block diagram of an operating environment, according to an embodiment of the present disclosure.

FIG. 3 depicts an example of a suitable operating environment 300 that may be used to implement the server hosting the orchestrator 115, or other computing devices within the systems discussed herein. In its most basic configuration, operating environment 300 typically includes at least one processing circuit 302 and memory 304. The processing circuit may be a processor, which is hardware. Depending on the exact configuration and type of computing device, memory 304 (storing instructions to perform the methods disclosed herein) may be volatile (such as RAM), non-volatile (such as ROM, flash memory, etc.), or some combination of the two. This most basic configuration is illustrated in FIG. 3 by dashed line 306. The memory 304 stores instructions that, when executed by the processing circuit(s) 302, perform the processes and operations described herein, such as forwarding operating parameters to the line system 100 or the transponders 110. Further, environment 300 may also include storage devices (removable 308, or non-removable 310) including, but not limited to, solid-state, magnetic disks, optical disks, or tape. Similarly, environment 300 may also have input device(s) 314 such as keyboard, mouse, pen, voice input, etc., or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing circuit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

As used herein, sending a communication (e.g., an alarm, a parameter, or a report) to a transponder 110 means sending the communication to the transponder adapter 125 connected to the transponder 110, or, if the transponder adapter 125 is integrated in the transponder 110 or absent, sending the communication or alarm directly to the transponder 110. As used herein, receiving a communication (e.g., an alarm or a report) from a transponder 110 means receiving the communication from the transponder adapter 125 connected to the transponder 110, or, if the transponder adapter 125 is integrated in the transponder 110 or absent, receiving the communication directly from the transponder 110.

As used herein, the word "or" is inclusive, so that, for example, "A or B" means any one of (i) A, (ii) B, and (iii) A and B. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

Although exemplary embodiments of a system and method for integrating alien wave transponders and a line system have been specifically described and illustrated herein, many modifications and variations will be apparent to those skilled in the art. Accordingly, it is to be understood that a system and method for integrating alien wave transponders and a line system constructed according to principles of this disclosure may be embodied other than as specifically described herein. The invention is also defined in the following claims, and equivalents thereof.

What is claimed is:

1. A system, comprising:
an optical line system, and
an orchestrator operatively connected to the optical line system,
the optical line system being configured to be operatively connected, at a first port of the optical line system, to a first optical transponder, and to be operatively connected, at a second port of the optical line system, to a second optical transponder,
the orchestrator being configured:
  to be operatively connected to the first optical transponder,
  to receive operating parameters from the optical line system and from the first optical transponder, and
  to send a received optical parameter to the optical line system or to the first optical transponder,
wherein the optical line system is configured to report, to the orchestrator, an optical power received, by the optical line system, at the first port, and
the system is configured to report, to the first optical transponder, the optical power.

2. The system of claim 1, wherein:
the orchestrator is further configured to receive, from the first optical transponder, a report of an optical power received by the first optical transponder from the first port; and
the system is configured:
  to determine that the optical power is below a first threshold, and
  in response to determining that the optical power is below the first threshold, to decrease an optical attenuation in the optical line system by an amount expected to bring the optical power above the first threshold, or to increase an optical gain in the optical line system by an amount expected to bring the optical power above the first threshold.

3. The system of claim 1, wherein the system is configured:
to determine that the optical power is less than a second threshold; and
in response to determining that the optical power is less than the second threshold, to send, to the first optical transponder, a low optical power alarm.

4. The system of claim 3, wherein:
the optical line system is further configured:
  to report, to the orchestrator, an optical power received, by the optical line system, at the second port, and
the system is further configured:
  to determine that the optical power received at the second port is less than the second threshold, and
  to report, to the first optical transponder and the second optical transponder, a tentative fault identification within the optical line system.

5. The system of claim 1, wherein the orchestrator is further configured to receive, from the first optical transponder, a report of an optical power transmitted by the first optical transponder.

6. The system of claim 1, wherein the optical line system is configured to report, to the orchestrator, an optical power transmitted at the first port.

7. The system of claim 1, wherein the optical line system is configured to report, to the orchestrator, a wavelength received at the first port.

8. The system of claim 7, wherein the system is configured:
to determine that the wavelength received at the first port differs from a wavelength assigned to the first port;
in response to determining that the wavelength received at the first port differs from the wavelength assigned to the first port:
  to send an incorrect wavelength alarm to the first optical transponder; and
  to attenuate an optical signal received from the first port.

9. The system of claim 1, wherein the system is configured to:
detect a fault, affecting a route from the first port to a third port at a first wavelength;
determine that an alternate route is available from the first port to the third port, at a second wavelength; and
send, to the first optical transponder, a report, reporting the fault and offering a connection at the second wavelength.

10. The system of claim 9, wherein the system is further configured:
to receive an acceptance of the connection at the second wavelength, and
in response to receiving the acceptance, to assign the second wavelength to the first optical transponder.

11. The system of claim 1, wherein the orchestrator is further configured to communicate with the first optical transponder through a protocol selected from the group consisting of: an applications programming interface (API), Network Configuration Protocol (NETCONF), and Representational State Transfer Configuration Protocol (RESTCONF).

12. The system of claim 1, wherein:
the orchestrator is configured to communicate with the first optical transponder via a first protocol, and
the orchestrator is configured to communicate with the second optical transponder via a second protocol, different from the first protocol.

13. A method, comprising:
receiving, by an orchestrator connected to an optical line system, a plurality of operating parameters from the optical line system, from a first optical transponder connected to a first port of the optical line system, and from a second optical transponder connected to a second port of the optical line system;
sending, by the orchestrator, an operating parameter of the plurality of operating parameters to the optical line system, or to the first optical transponder, or to the second optical transponder;
reporting, by the optical line system, to the orchestrator, an optical power received, by the optical line system, at the first port; and
reporting, by the orchestrator, to the first optical transponder, the optical power.

14. The method of claim 13, further comprising:
receiving, by the orchestrator, from the first optical transponder, a report of an optical power received by the first optical transponder from the first port;
determining that the optical power is below a first threshold; and in response to determining that the optical power is below the first threshold, decreasing an optical attenuation in the optical line system by an amount expected to bring the optical power above the first threshold or increasing an optical gain in the optical line system by an amount expected to bring the optical power above the first threshold.

15. The method of claim 13, further comprising:

determining that the optical power is less than a second threshold; and in response to determining that the optical power is less than the second threshold, sending, by the orchestrator, to the first optical transponder, a low optical power alarm.

16. The method of claim 15, further comprising:

reporting, by the optical line system, to the orchestrator, an optical power received, by the optical line system, at the second port of the optical line system, from the second optical transponder;

determining that the optical power received at the second port is less than the second threshold; and reporting, by the optical line system, to the first optical transponder and the second optical transponder, a tentative fault identification within the optical line system.

17. The method of claim 13, wherein the orchestrator is configured to communicate with the first optical transponder via a first protocol, and the orchestrator is configured to communicate with the second optical transponder via a second protocol, different from the first protocol.

* * * * *